(12) United States Patent
Rieger et al.

(10) Patent No.: US 9,216,617 B2
(45) Date of Patent: Dec. 22, 2015

(54) ANTI-SKID DEVICE

(75) Inventors: Hansjorg Rieger, Aalen (DE); Peter Hofmann, Aalen-Unterkochen (DE); Wolfgang Biehler, Aalen (DE)

(73) Assignee: RUD Ketten Rieger & Dietz GmbH u. Co. KG, Aalen (DE)

( * ) Notice: Subject to any disclaimer, the term of this patent is extended or adjusted under 35 U.S.C. 154(b) by 2363 days.

(21) Appl. No.: 11/922,541

(22) PCT Filed: Jun. 7, 2006

(86) PCT No.: PCT/EP2006/005402
§ 371 (c)(1),
(2), (4) Date: Feb. 26, 2009

(87) PCT Pub. No.: WO2006/136286
PCT Pub. Date: Dec. 28, 2006

(65) Prior Publication Data
US 2009/0211679 A1 Aug. 27, 2009

(30) Foreign Application Priority Data
Jun. 21, 2005 (DE) .......... 10 2005 029 664

(51) Int. Cl.
*B60B 39/00* (2006.01)

(52) U.S. Cl.
CPC ............. *B60B 39/006* (2013.01); *B60B 39/003* (2013.01)

(58) Field of Classification Search
CPC .............................. B60B 39/00; B60B 39/006
USPC ..... 188/4 R, 4 B, 5; 280/757; 74/89.2, 89.21, 74/89.22
See application file for complete search history.

(56) References Cited

U.S. PATENT DOCUMENTS

| | | | |
|---|---|---|---|
| 2,283,948 | A | 5/1942 | Ridgway |
| 3,044,313 | A | 7/1962 | Heckathom |
| 3,267,816 | A | 8/1966 | Graham |
| 3,709,105 | A | 1/1973 | Ridley |
| 3,785,214 | A * | 1/1974 | Ridley .................... 74/89.21 |
| 4,225,110 | A | 9/1980 | Akkerman et al. |
| 4,809,797 | A | 3/1989 | Guyot |
| 5,035,171 | A | 7/1991 | Gottling et al. |
| 6,409,215 | B1 | 6/2002 | Holmgren |

FOREIGN PATENT DOCUMENTS

| | | |
|---|---|---|
| CH | 393866 | 6/1965 |
| DE | 29815979 | 12/1998 |
| DE | 69912396 | 4/2003 |
| DE | 102005029664 | 8/2006 |
| EP | 0278896 | 8/1988 |
| EP | 0 487 297 | 5/1992 |
| EP | 1 049 591 | 11/2000 |
| EP | 1049591 | 11/2000 |
| GB | 1 379 555 | 1/1975 |
| JP | 50-013908 | 2/1975 |
| WO | 9938714 | 8/1999 |

* cited by examiner

*Primary Examiner* — Nicholas J Lane
(74) *Attorney, Agent, or Firm* — Mark P. Stone

(57) ABSTRACT

In an anti-skid device having lengths of chain which can be thrown under a vehicle wheel by means of a rotary plate which is arranged at the end of a pivotable extension arm (5), a drive unit having a piston (16) which is arranged in a cylinder (11) and whose movements are transmitted by a thrust chain (22) which assumes the function of the piston rod, to a drive pinion (29) whose shaft bears the extension arm (5) is used to apply the pivoting movement to the extension arm (5).

14 Claims, 5 Drawing Sheets

ANTI-SKID DEVICE

TECHNICAL FIELD

The invention relates to an anti-skid device with several lengths of chain fixed to a rotary holder, the portions of the lengths of chain facing away from the holder in the operating position being thrown from the rotating holder under centrifugal action to the area of the ground-contacting surface of a rotating vehicle wheel, with a pivoting unit for an extension arm bearing the holder and with means for applying opposed pivoting movements to the pivoting unit by which the extension arm can be moved from a rest position into its operating position and back, wherein the means for applying the pivoting movements to the pivoting unit are formed by a drive unit with a piston guided in a pneumatic cylinder, by which, with an interposed transmission element formed by a thrust chain comprising a front link and an end link, pivoting movements can be applied to a drive wheel or drive pinion connected to the front link, whose shaft which is held in a housing bears the extension arm for the holder.

PRIOR ART

An anti-skid device of the above-mentioned type is described in the EP 1 049 591 B1 as a non-depicted alternative embodiment of a construction in which the end of a piston rod projecting from a cylinder to both sides of which compressed air can be admitted is connected to a length of chain forming a closed loop the links of which length of chain pass a drive wheel or a drive pinion and a non-splined deflection pulley. By the replacement of the closed chain loop with a thrust chain, the deflection pulley can be dispensed with.

Moreover, a similarly designed anti-skid device is known, namely from the EP 0 278 896 B1, in which one portion of the piston rod of the piston guided in a cylinder to both sides of which compressed air can be admitted is designed as a toothed rack meshing with a drive pinion.

In both known anti-skid devices, a housing connected to the pneumatic cylinder serves for accommodating the drive wheel or drive pinion for the pivoting unit, the overall length of the housing necessarily being longer than the stroke of the piston to which compressed air is admitted.

REPRESENTATION OF THE INVENTION

With respect to the fact that the space available for accommodating suitable anti-skid devices in vehicles is comparably small, there is an urgent demand for a compact construction. It is an object of the invention to take into account this urgent demand.

The object is achieved according to the invention in that the end link of the thrust chain is directly connected to the piston of the drive unit, thus forming a piston rod, and that the housing accommodating the drive wheel or drive pinion and the part of the cylinder facing the housing form a common pressure space to which compressed air can be admitted.

The anti-skid device according to the invention offers the advantage that the overall length of the housing accommodating the drive wheel or drive pinion, respectively, can be reduced to a fraction of the overall length of the pneumatic cylinder or the piston stroke, respectively. The prerequisite for the realization of the claimed solution was the abandonment of the principle of a distinct separation of the drive unit formed by a piston guided in a cylinder from the respective unit to be driven, as has been done for a very long time with standard cylinders, series cylinders and special cylinders (cf. Ebertshäuser/Helduser, "*Fluidtechnik von A bis Z*", 2nd ed., page 177). In other words, the thrust chain known per se does not replace a chain loop, as is the case with the anti-skid device of the EP 1 049 591 B1, but it fulfills in a way the function of a toothed rack designed as a flexible piston rod.

Further details of the invention will be obvious from the following description of a particularly advantageous embodiment of the invention represented in the enclosed drawings and from the subclaims.

WAYS OF REALIZING THE INVENTION

Figure 1:
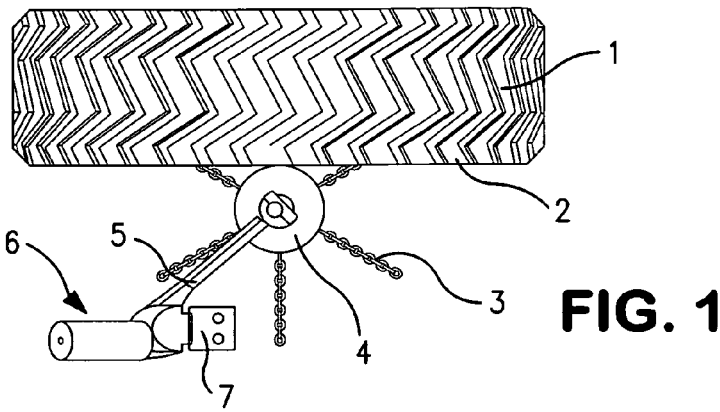
FIG. 1 shows, in a highly schematic way, the essential parts of an anti-skid device according to the invention in the operating position.
Figure 2:
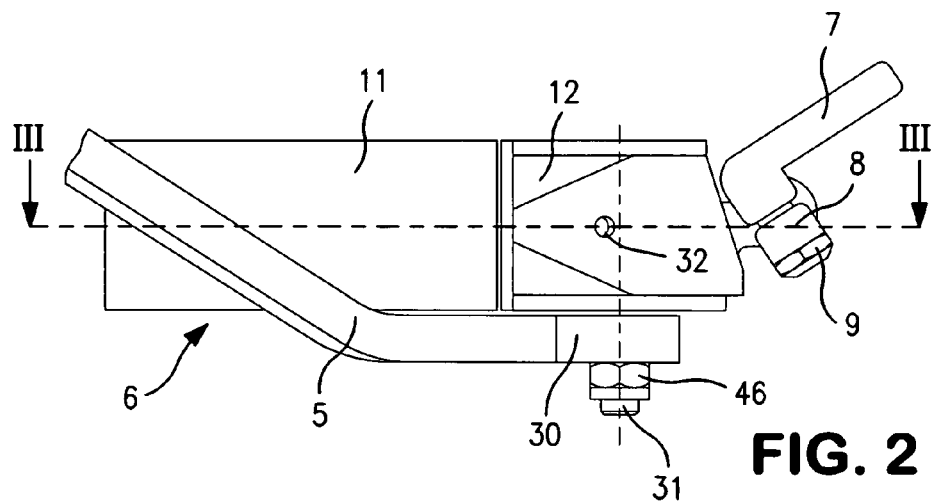
FIG. 2 shows, in an enlarged scale, a side view of the drive unit of the device according to FIG. 1.
Figure 3:
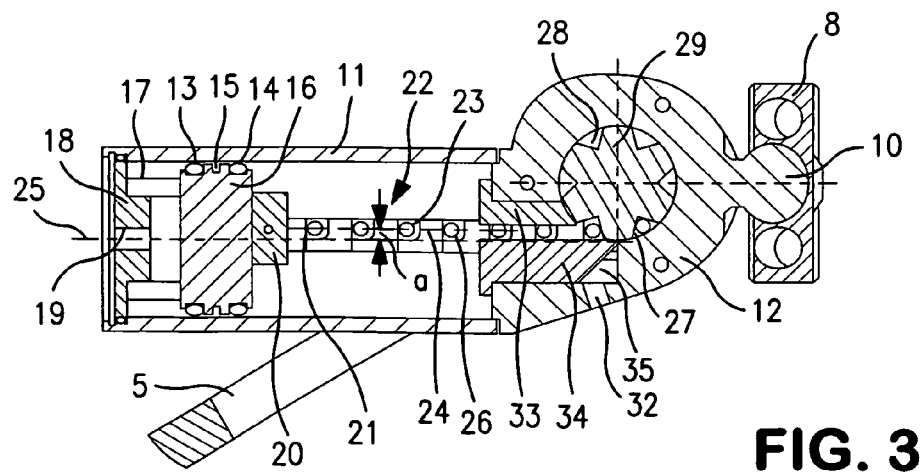
FIG. 3 shows a section along the line III-III in FIG. 2.
Figure 4:
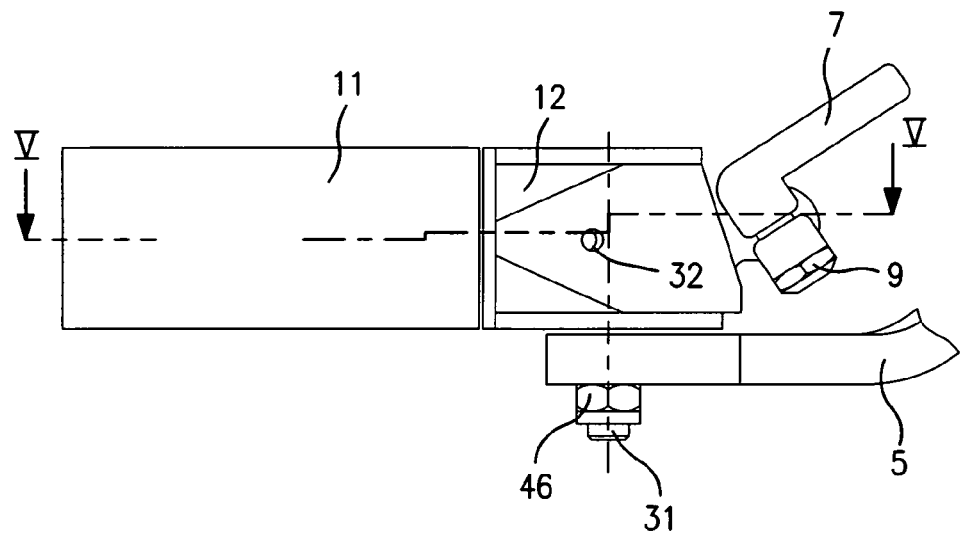
FIG. 4 shows a side view corresponding to FIG. 2.

In FIG. 1, a vehicle wheel 1 is shown against the flank 2 of which a rotary plate 4 provided with spinning or hurling chains 3 is pressed for applying a rotary motion. The rotary plate 4 is held at the free end of a pivotable extension arm 5 to which a drive unit 6 can apply a reciprocating motion. A fixing flange 7 serves for fixing the drive unit 6 to the vehicle, the flange being clampable to a ball head 10 in a desired position by means of a crosspiece 8 and two attachment screws 9, wherein the fixing flange 7 as well as the crosspiece 8 are provided with caps having the shape of partial balls and being adapted to the shape of the ball head 10.

The drive unit 6 comprises a cylinder 11 and an essentially cylindrical housing 12 joining the one end of the cylinder. A piston 16 provided at its circumference with two flexible sealing collars 13, 14 and a comparably broad piston ring 15 is held in the cylinder 11 so as to be reciprocated. The piston 16 abuts an elastic backup ring 17 in an end position To be able to admit a pressurizing medium, preferably formed by compressed air, to the side of the piston 16 facing the backup ring 17, a cover plate 18 of the cylinder 11 supporting the backup ring 17 is provided with a hole 19 for the connection of a non-depicted compressed-air line.

At its side facing away from the cover plate 18, the piston 16 comprises a connection web 20 for the end link 21 of a thrust chain 22, the connection point being selected such that the line 24 extending through the centers of the hinge pins 23 interconnecting the links of the thrust chain 22 is disposed so as to be offset by an amount a with respect to the central axis 25 of the cylinder 11 and the piston 16 to ensure a centric load of the piston 16. The hinge pin 23 of the front link 27 of the thrust chain 22, which hinge pin is not used as a joint and surrounded, as all hinge pins 23, by a rotary sleeve 26, engages with one of the spacewidths 28 of a drive pinion 29 forming one piece with a shaft 31 projecting from the housing 12 and being encompassed by the end 30 of the extension arm 5.

Figure 5:
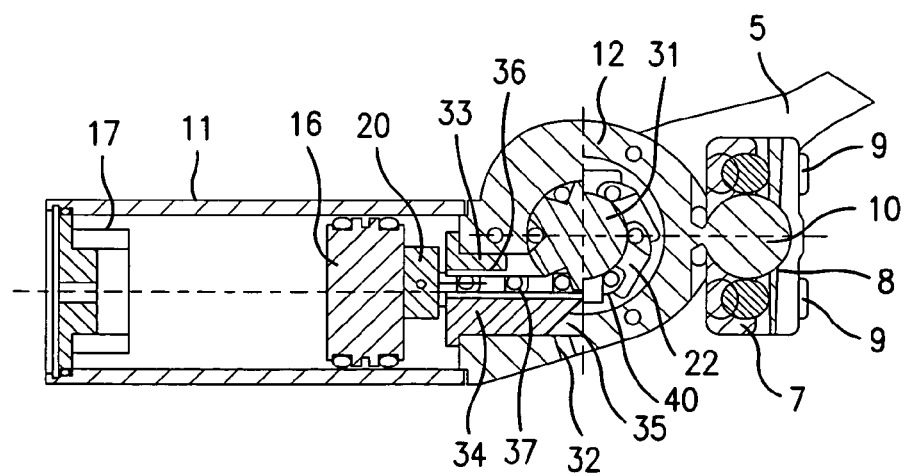
FIG. 5 shows a section along the line V-V in FIG. 4.
Figure 6:
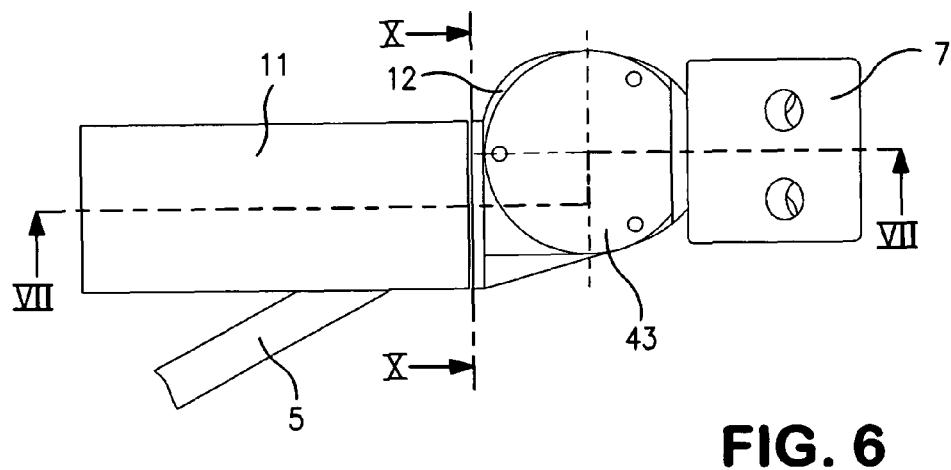
FIG. 6 shows a plan view of the drive unit according to FIGS. 2 to 4.
Figure 7:
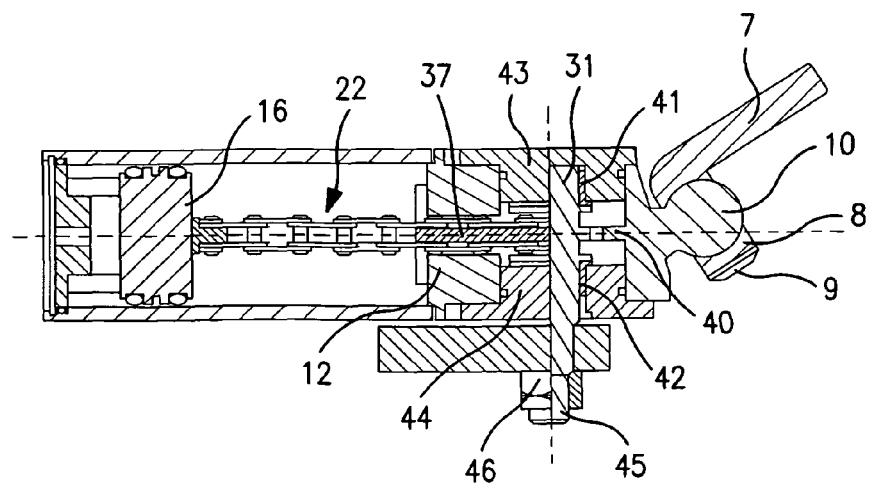
FIG. 7 shows a section along the line VII-VII in FIG. 6.
Figure 8:
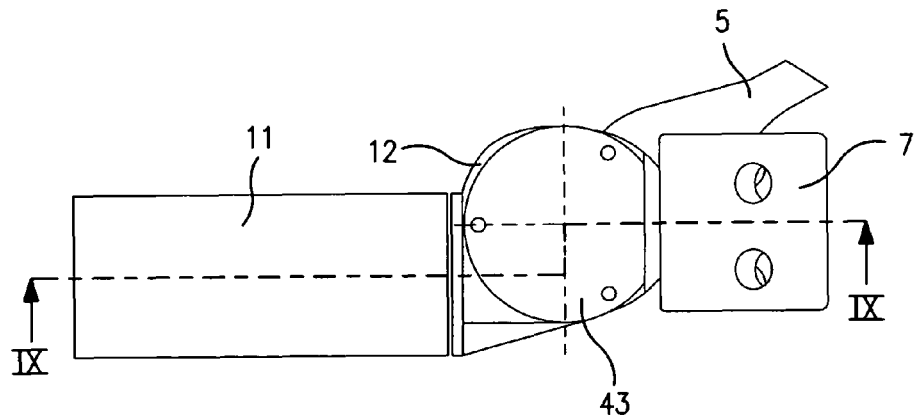
FIG. 8 shows a plan view corresponding to FIG. 6.
Figure 9:
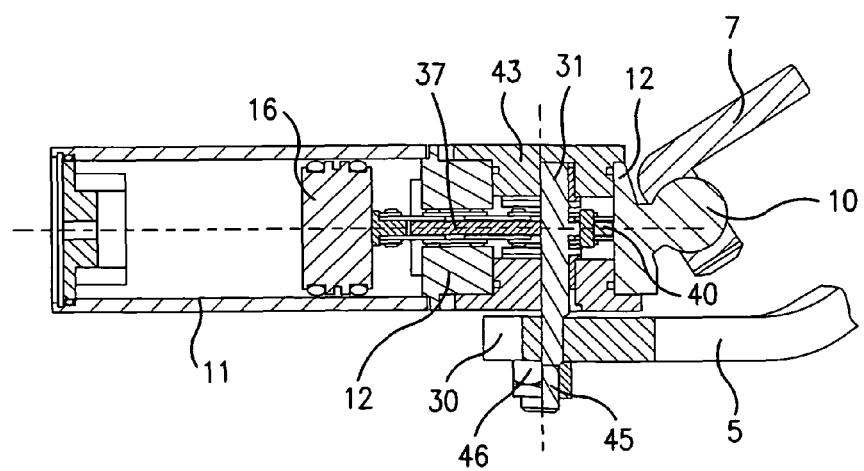
FIG. 9 shows a section along the line IX-IX in FIG. 8.
Figure 10:
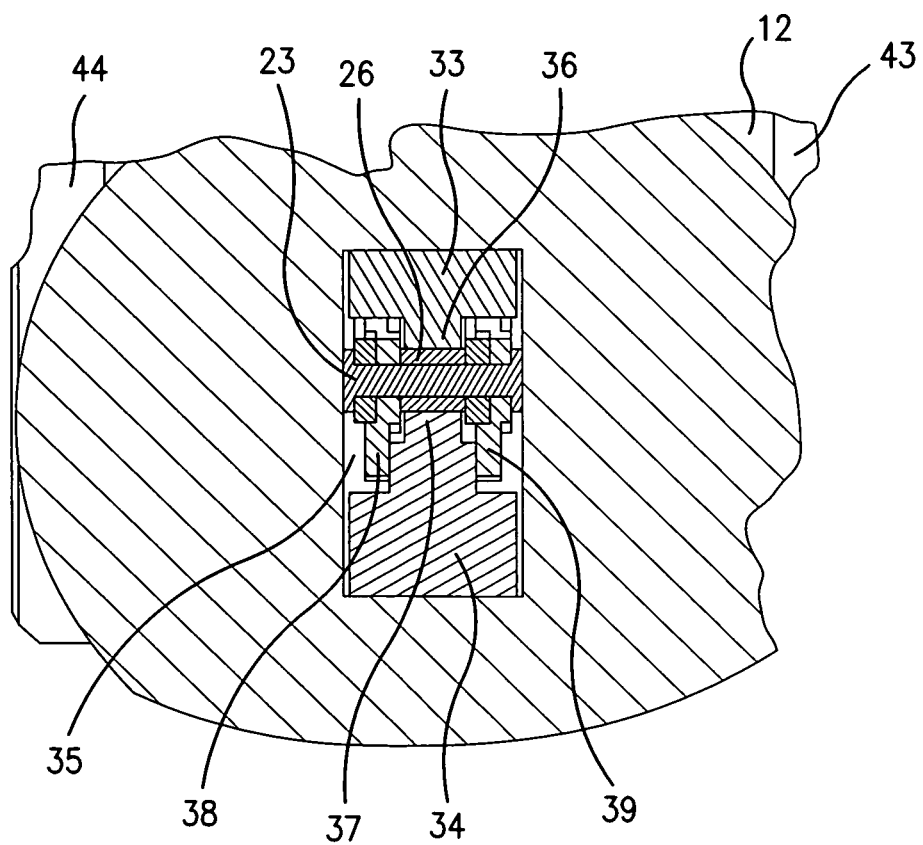
FIG. 10 shows, in a highly enlarged scale, a partial section along the line X-X in FIG. 6.

To be able to admit a pressurizing medium to the side of the piston 16 facing away from the backup ring 17, the housing 12 is provided with a hole 32 to which another, non-depicted pressurizing medium line can be connected. The interior of the housing 12 and the space of the cylinder 11 facing the housing 12 are interconnected via a channel 35 provided with guide insets 33 and 34 for the thrust chain 12 and thus form a common pressure space or chamber. The guide insets 33 and 34 comprise—as can be seen in FIG. 5—guide webs 36, 37 which project between the parallel flanks 38, 39 of the links of the thrust chain 22, the parallel flanks being interconnected by the hinge pins 23, the portions of the flanks 38, 39 facing the guide webs 36, 37 forming guide channels for the guide webs 36, 37 (cf. FIG. 10). A guide web 40 formed by an annular projection of the housing wall and projecting into the interior of the housing 12 continues the guide web 37, so that the thrust chain 22 is guided nearly over its complete length in the position represented in FIGS. 5 and 9 that approximately corresponds to an end position, and in particular its hinge pins 23 and sleeves 26, respectively, are securely held in the spacewidths 28 of the drive pinion 29 when the thrust chain 22 is loaded with pressure. The stroke of the piston 16 and the number of teeth of the drive pinion 29 are tuned to each other such that the thrust chain 22 nearly completely encloses the drive pinion 29 in one of the end positions of the piston. As a part of the teeth of the thrust chain 22 is located in the area of the guide webs 36, 37 in the end position of the piston 16, the number of links of the thrust chain 22 has to be higher than the number of teeth of the drive pinion 29.

The shaft 31 of the drive pinion 29 is held in sliding bearings 41, 42 of two lids 43, 44, closing the housing. A threaded stem 45 and a fastening nut 46 serve for fixing the extension arm 5 on the shaft 31.

The invention claimed is:

1. Anti-skid device
    with several lengths of chain fixed to a rotary holder,
        portions of the lengths of chain facing away from the holder in an operating position being thrown from the rotating holder under centrifugal action to an area of a ground-contacting surface of a rotating vehicle wheel,
        and with a drive unit with a piston guided in a pneumatic cylinder, by which drive unit, with an interposed transmission element formed by a thrust chain comprising a front link and an end link, an extension arm bearing the holder can be moved from a rest position into an operating position and back, and
by which drive unit pivoting movements can be applied to a drive wheel or drive pinion connected to the front link, a shaft of said drive wheel or drive pinion being held in a housing that bears the extension arm for the holder,
characterized in that
the end link of the thrust chain (22) is directly connected to the piston (16) of the drive unit (6), thus forming a piston rod,
and that the housing (12) accommodating the drive wheel or drive pinion (29) and a part of the cylinder (11) facing the housing (12) form a common pressure space to which compressed air can be admitted, wherein:
    the housing (12) accommodating the drive pinion (29) and the shaft (31) thereof is provided with guide insets (33, 34) for the thrust chain (22), and
    a further guide is formed by an annular guide web (40) enclosing the tip circle of the teeth of the drive pinion 29 on a part of its circumference with clearance.

2. Anti-skid device according to claim 1, characterized in that the front link (27) of the thrust chain (22) engages with a spacewidth (28) of the drive pinion (29) in an end position of the piston (16) with one hinge pin (23) of hinge pins (23) of the front link (27) interconnecting link flanks (38, 29) of the front link (27) arranged in parallel one to another.

3. Anti-skid device according to claim 2, characterized in that the number of teeth of the drive pinion (29) is less than the number of links of the thrust chain (22).

4. Anti-skid device according to claim 1, characterized in that the housing (12) accommodating the drive pinion (29) and the shaft (31) thereof is in communication with the cylinder (11) via a channel (35) forming a passage for the thrust chain (22).

5. Anti-skid device according to claim 1, characterized in that the guide web (40) extends over approximately 270° of the tip circle of the teeth of the drive pinion (29).

6. Anti-skid device according to claim 2, characterized in that the guide insets (33, 34) comprise guide webs (36, 37) formed as straight-line guidance which transfer the hinge pins (23) interconnecting the links of the thrust chain (22) tangentially into the area of the reference circle of the teeth of the drive pinion (29).

7. Anti-skid device according to claim 2, characterized in that axes of the hinge pins (23) interconnecting the links of the thrust chain (22) are located on a straight line (24) which is arranged to be offset by an amount (a) with respect to the central longitudinal axis (25) of the piston (16).

8. Anti-skid device according to claim 1, characterized in that rotary sleeves (25) are held on the hinge pins (23) of the thrust chain (22).

9. Anti-skid device according to claim 2, characterized in that the housing (12) accommodating the drive pinion (29) and the shaft (31) thereof is in communication with the cylinder (11) via a channel (35) forming a passage for the thrust chain (22).

10. Anti-skid device according to claim 3, characterized in that the housing (12) accommodating the drive pinion (29) and the shaft (31) thereof is in communication with the cylinder (11) via a channel (35) forming a passage for the thrust chain (22).

11. Anti-skid device according to claim 1, characterized in that the guide insets (33, 34) comprise guide webs (36, 37) formed as a straight-line guidance which transfer hinge pins (23) interconnecting the links of the thrust chain (22) tangentially into the area of the reference circle of the teeth of the drive pinion (29).

12. Anti-skid device according to claim 5, characterized in that the guide insets (33, 34) comprise guide webs (36, 37) formed as a straight-line guidance which transfer hinge pins (23) interconnecting the links of the thrust chain (22) tangentially into the area of the reference circle of the teeth of the drive pinion (29).

13. Anti-skid device according to claim 3, characterized in that axes of the hinge pins (23) interconnecting the links of the thrust chain (22) are located on a straight fine (24) which is arranged to be offset by an amount (a) with respect to the central longitudinal axis (25) of the piston (16).

14. Anti-skid device according to claim 2, characterized in that rotary sleeves (26) are held on the hinge pins (23) of the thrust chain (22).

* * * * *

UNITED STATES PATENT AND TRADEMARK OFFICE
CERTIFICATE OF CORRECTION

PATENT NO. : 9,216,617 B2  
APPLICATION NO. : 11/922541  
DATED : December 22, 2015  
INVENTOR(S) : Hansjorg Rieger et al.

Page 1 of 1

It is certified that error appears in the above-identified patent and that said Letters Patent is hereby corrected as shown below:

Claims

Claim 8, Line 2 (Column 4, Line 31): Before "hinge pins (23)", delete "the".

Claim 13, Line 3 (Column 4, Line 57): Delete "fine", and substitute --line--.

Signed and Sealed this
Twenty-second Day of March, 2016

Michelle K. Lee
*Director of the United States Patent and Trademark Office*